United States Patent [19]
Needham et al.

[11] 3,773,016
[45] Nov. 20, 1973

[54] MILKER CONTROL

[75] Inventors: Lyle L. Needham, Bellwood; Don W. Fitzpatrick, Downers Grove, both of Ill.

[73] Assignee: Babson Bros., Co., Oak Brook, Ill.

[22] Filed: Jan. 31, 1972

[21] Appl. No.: 222,134

[52] U.S. Cl............................ 119/14.08, 119/14.14
[51] Int. Cl. ............................................. A01j 05/04
[58] Field of Search...................... 119/14.08, 14.15, 119/14.14

[56] References Cited
UNITED STATES PATENTS 3,115,116  12/1963  Schilling et al. .................. 119/14.08
2,576,808  11/1951  Perkins ............................ 119/14.08

*Primary Examiner*—Hugh R. Chamblee
*Attorney*—Axel A. Hofgren et al.

[57] ABSTRACT

A control circuit for an automatic milker unit includes a circuit for sensing the flow of milk from each teat cup. When the flow ceases, the liquid sensing circuit actuates a time delay circuit which in turn operates to cause a pneumatic piston to remove the teat cup from the animal. A dribble or sloshing of milk during the time delay does not prevent teat cup removal. However, a resumption of steady milk flow for an extended period of time during the delay will prevent removal of the teat cup until a subsequent cessation of milk flow. A circuit is provided for disabling the sensing circuit for a period of time to permit the operator to attach the teat cups at the start of the milking operation. The four sensing circuits of the milker unit are connected with an output circuit which detects the absence of milk flow from all four quarters of the animal and produces a "not milking" signal for energizing indicators or other milking system devices. The output circuit also produces an inverse "milking" signal to energize a motor for supplying feed to the animal or operate other devices so long as milk is flowing.

22 Claims, 3 Drawing Figures

PATENTED NOV 20 1973 3,773,016

MILKER CONTROL

This invention relates to a control for a milker having means for automatically removing the teat cups as individual quarters of the cow are milked out.

Mechanical milkers generally utilize a double action milking operation. Teat cups comprising a metal shell with a flexible liner or inflation therein are placed on the cow's teats. The interior of the inflation is connected with a vacuum source while the space between the inflation and shell is alternately evacuated and vented to air. During the period of time the interior of the shell is evacuated, the inflation is expanded and the animal's teat is exposed to the evacuated interior of the inflation. The sphincter muscle at the end of the teat opens and milk flows out through the inflation and a flexible stem connected therewith through a manifold or bowl to a pipeline or into a bucket. When the interior of the shell is vented to air, the inflation collapses, massaging the teat and affording milk an opportunity to flow through the udder to the base of the teat. The inflation is commonly expanded and collapsed at a rate of the order of 60 times per minute.

As each quarter of the cow is milked out, the teat cup should be removed. It is the general practice for an operator to determine by observation when this occurs and to remove the teat cup. Training, experience and concentration are required to remove the teat cups at the appropriate time. If they are not removed, the application of vacuum to a dry teat can damage the tissue and cause infection.

Milkers which are automatically removed when milk flow ceases have been shown in the patent literature for more than 50 years. An early form is illustrated in Sabroe U.S. Pat. No. 835,918. More recently, Schilling et al. U.S. Pat. No. 3,115,116 proposed an automatic milker with electrical milk flow sensing and an apparatus for applying a pull to the teat cup assembly, before shutting off vacuum to the inflation when milk flow ceased. It was found in practice, however, that the Schilling et al. control which released the teat cup assembly if milk started to flow again had the effect of causing an increase in the milking time with practically no increase in milk production.

There have been mechanical float valves proposed for shutting off the vacuum to the inflation. Tanner U.S. Pat. No. 2,718,208, Eades U.S. Pat. No. 2,836,148 and Babson U.S. Pat. No. 2,902,975 are examples. Albert A. Perkins has patented many mechanical valves for shutting off vacuum to the inflation when milk flow ceases.

None of these prior milkers has been successfully used commercially, for a variety of reasons. Most of them are subject to erratic operation. The mechanical float milkers have a problem with clogging and the flow of milk past the valve sometimes causes it to seat prematurely. Complex mechanical constructions made the units difficult to clean.

The continued increase in the cost of farm labor and the difficulty of keeping competent, trained milkers have provided an impetus for the development of an improved automatic milker and control. This invention is concerned with a control particularly designed for the automatic milker disclosed and claimed in Needham et al. U.S. Pat. No. 3,726,252, issued Apr. 10, 1973.

One feature of the invention is the provision of a control which senses a cessation or interruption of the flow of milk and initiates the removal of the associated teat cup, and which is insensitive to a temporary resumption of milk flow. More particularly, the liquid sensing circuit includes a capacitor which is charged so long as milk flow continues and which is discharged rapidly when flow ceases. The charge circuit for the capacitor has a longer time constant than discharge circuit so that a temporary flow resumption does not permit the capacitor to recharge and interrupt the teat cup removal.

Another feature is that the control includes a circuit with a time delay capacitor which begins to charge on cessation of flow to establish a timing period at the end of which the teat cups are removed. During this timing period a small dribble of milk or temporary resumption of flow does not affect the operation of the control. However, a recurrence of continuous flow permits the sensing circuit capacitor to recharge, discharging the time delay capacitor and the milking operation continues.

A further feature is the provision of a transistor switch connected with the liquid sensing circuit, having a temporary inhibit condition maintaining the sensing circuit in its first condition maintaining the sensing circuit in its first condition in the absence of a flow of milk. A manual switch actuated by the operator connects a capacitor with a source of potential, charging the capacitor and establishing the temporary condition of the switch. A resistive network connected with the capacitor dissipates the charge thereon and the time constant of the capacitor and the resistive network establish the duration of the temporary inhibit condition.

Still another feature is the provision of a sensing circuit connected with each of the flow sensing means for the four teat cups of a milker unit and an output circuit connected with the sensing circuits, having a first condition in response to a flow of milk from any one of the teat cups and a second condition responsive to an absence of a flow of milk from all of the teat cups. The output circuit includes a first switch conductive only in the first condition of the output circuit connected with an indicator light and with sufficient capacity to operate other devices, as a feed motor for delivering feed to the animal so long as milk flow continues. The output circuit also includes a second switch conductive only in the second condition of the output circuit and connected with an operator signal and for operating auxiliary indicating and power switching devices.

Further features and advantages of the invention will readily be apparent from the following specification and from the drawings, in which.

Figure 1:
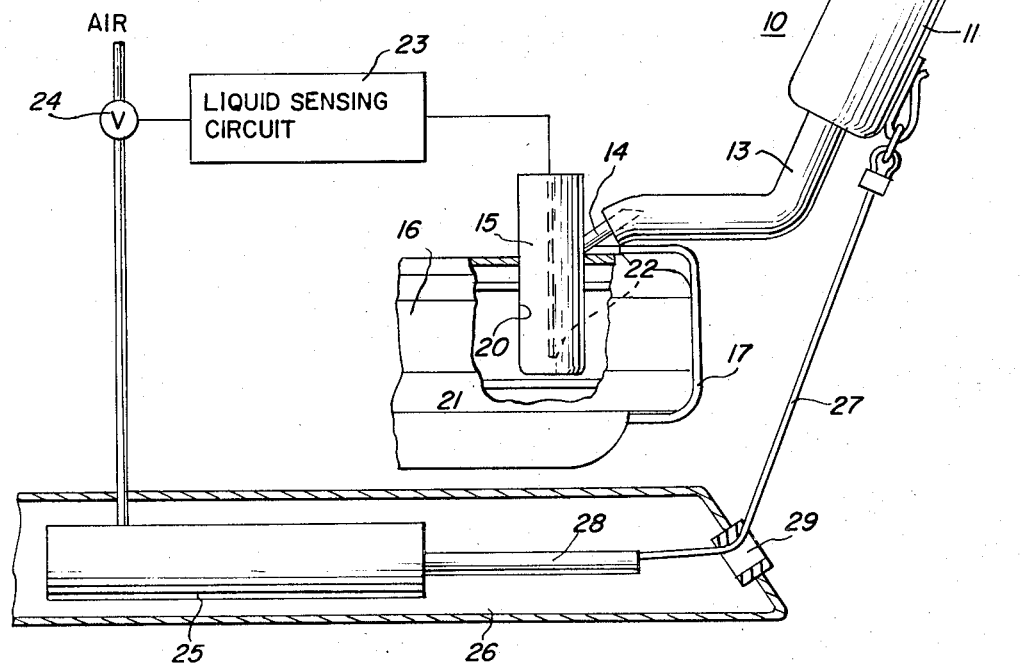
FIG. 1 is a diagrammatic illustration of a milker with means for removing a teat cup from an animal's teat.

A portion of the automatic milker of the Needham et al application is illustrated in FIG. 1. A teat cup assembly 10 includes a shell 11 with an inflation 12 having a stem 13 connected with the nipple 14 of a milk accumulation well 15 mounted in the cover 16 of a milk receiving chamber 17. Milk flows from the cow through the inflation into the well and overflows into the interior of the chamber 17 from which it is removed through an evacuated milk line, not shown. Most of the milk spills out of well 15 through a port 20 in the wall. A portion of milk, however, collects in the bottom of the well and drains out through a small orifice 21 in the bottom wall. An electrically conductive probe 22 extends into the lower portion of the well and is contacted by the milk. Probe 22 is connected with a liquid sensing circuit 23 which controls an air valve 24 connected with a pneumatic piston and cylinder 25 mounted under the base 26 of the milker unit. A cable 27 extends from piston rod 28 out of the base through bushing 29 and is connected with the teat cup shell 11. When the milk flow ceases and the milk drains from the bottom of the well through opening 21, valve 24 is opened causing piston rod 28 to move to the left, applying a downward pull to the teat cup assembly 10. The stem 13 of the inflation kinks as illustrated in the drawing, sealing the end of nipple 14 and closing off the vacuum to the interior of the inflation. Air leaks into the inflation around the cow's teat and the teat cup assembly drops off.

The milker unit has four teat cup assemblies with a liquid sensor, a liquid sensing circuit, air valve and pneumatic cylinder for each. Further details of the mechanical construction may be found in the Needham et al. application. The control may, of course, be used with automatic milkers having other means for removing teat cups, as for example, those of Cramp U.S. Pat. No. 952,978 or Perkins U.S. Pat. No. 2,576,808.

Figure 2:
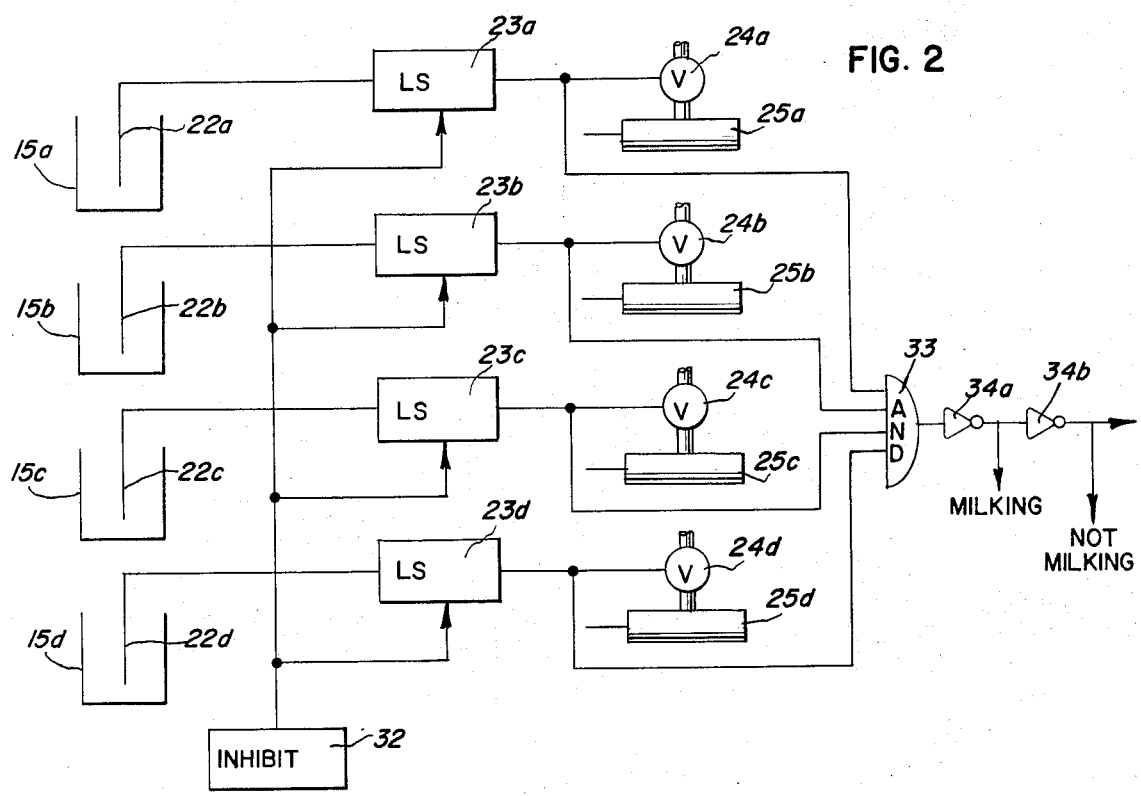
FIG. 2 is a block diagram illustrating the operation of the control.

FIG. 2 illustrates the control for the milker unit in block diagram form. The milk flow measuring wells 15a, 15b, 15c and 15d each have a probe 22a, 22b, 22c and 22d. Each probe is connected with a liquid sensing circuit 23a–23d, and the outputs of the sensing circuits are connected with air valves 24a–24d which operate the four piston and cylinder devices 25a–25d, respectively. As the milk flow from each quarter ceases, the associated air valve is opened actuating the piston to remove the teat cup.

A common "inhibit" circuit 32 is connected with each of the liquid sensing circuits 23a–23d. Actuation of the inhibit circuit by the operator closes each of the valves 24a–24d for a period of time sufficient for the operator to attach the teat cup assemblies 10 to the cow and for milk to begin to flow, keeping them closed.

An AND gate 33 and two serially connected inverters 34a, 34b connected with the output of each of the liquid sensing circuits 23–23d have outputs which represent MILKING and NOT MILKING conditions and may be used to energize signals or to operate power switching circuits to control a feed delivery motor or the like.

Figure 3:
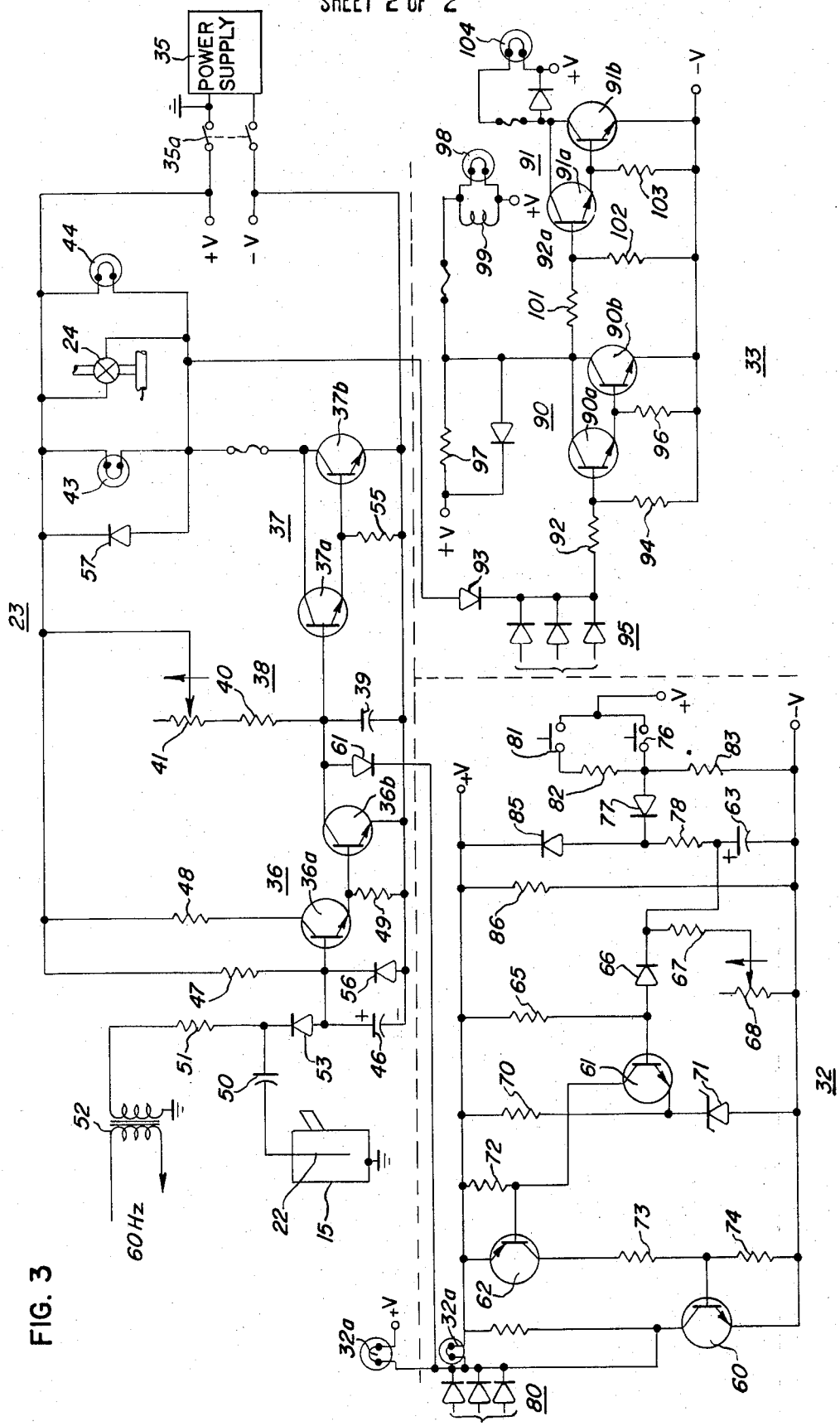
FIG. 3 is a schematic diagram of the control circuit.

In FIG. 3 a preferred emobdiment of the liquid sensing circuit is illustrated. During the description of the circuit representative component types and values will be indicated. It is to be understood that this specific information is given for the purpose of disclosing an operative circuit and that the values are not critical unless indicated to the contrary. Some of the circuits of the control operate by virtue of the charging or discharging of capacitor to turn a transistor on or off. These functional relationships are described specifically in the specification and in some cases recited in the claims. The charge and discharge characteristics and conduction conditions of the transistors may be reversed by utilizing transistors of the opposite conductivity type by the addition of inverter stages or by other changes in the circuit. Accordingly, it is intended that the specific functional relationships include the inverse relationships.

The control circuit is energized by a power supply 35 having a 13 volt DC output, with the positive terminal grounded. The points in the schematic indicated +V and −V are connected with the appropriate power supply terminals. Switch 35a may be opened to provide non-automatic operation. Each of the transistors, unless otherwise indicated, is an NPN type 2N4946. The diodes are type 1N4454.

The milk flow sensing circuit 23 includes first and second transistor switches 36 and 37 and a time delay circuit 38. Each of the switches includes two transistors 36a, 36b and 37a, 37b, respectively. During the milking operation, while milk is flowing, transistor switch 36 is on or conducting while transistor switch 37 is off. When the milk flow ceases, the first switch 36 turns off, and capacitor 39 of the time delay circuit 38 begins to charge through resistor 40 and potentiometer 41. As the charge on capacitor 39 builds up, a point is reached where transistor switch 37 is turned on. This energizes air valve 24 actuating the teat cup removal mechanism. Indicator lights 43 and 44 are energized. One light is located on a unit control panel mounted on the stall where the cow is milked while the other is located on the control circuit board (not shown).

The base control element of the first transistor 36a of switch 36 is connected across an integrating capacitor 46, 5μf. The capacitor is charged with the indicated polarity through resistor 47, 180,000 ohms, so long as milk is flowing through the associated sensing well 15. The positive bias potential on the base causes transistor 36a to conduct, connecting collector resistor 48, 4700 ohms, and emitter resistor 49, 4700 ohms, in series across the power supply. The base-emitter circuit of second transistor 36b is connected across resistor 49 and the positive potential on the base causes it to conduct. The collector of transistor 36b is connected to the junction between capacitor 39 and resistor 40 in the time delay circuit and, so long as transistor 36b conducts, capacitor 39 is effectively shorted and has no charge across it. The base control element of transistor 37a of the second switch is also connected to the junction between capacitor 39 and resistor 40 and is effectively at the negativve power supply potential so long as the first switch 36 conducts. This prevents transistors 37a and 37b from conducting while milk is flowing.

Sensing electrode 22 is connected through capacitor 50, 5μf, and resistor 51, 15,000 ohms, with the secondary of a transformer 52, the primary of which is connected with a 50 or 60 Hertz supply. The output voltage of transformer 52 is of the order of 17 volts RMS (24 volts, peak). So long as milk is flowing and the lower portion of well 15 is filled, probe 22 provides a relatively low resistance path, approximately 15,000 ohms, through the milk to ground, the positive terminal of power supply 35. The reactance of capacitor 50 is small compared with the other circuit components (much less than resistor 51) and thus the negative peak voltage at the junction between capacitor 50 and resistor 51 does not exceed the negative supply voltage, −V. Diode 53 connected between capacitor 46 and the junction between capacitor 50 and resistor 51 is not forward biased and appears as an open circuit. When the milk flow ceases and the circuit between probe 22 and ground is open, diode 53 acts as a polarity sensitive switch conducting through resistor 51 when the upper terminal of the secondary winding of transformer 52 is more negative than negative supply voltage, −V. When the base of transistor 36a is driven to a more negative voltage, transistor 36a ceases conduction and turns off transistor 36b. The time constant of the negative charging circuit for capacitor 46 through resistor 51 is much shorter than that of the positive charge circuit through resistor 47. With the circuit values given above, the negative charge time is roughly one-tenth the positive charge time. Transistor 36a responds to cessation of milk flow within a matter of a few cycles of the voltage applied to the probe.

In the specification and claims, capacitor 46 is described as charging either positively or negatively through one or the other of two charge paths. Whether the capacitor charges or discharges depends on the point of reference which is used. The important relationship is the voltage between the base and emitter of transistor 36a which determines whether the transistor conducts. The potential of the capacitor with respect to ground or some other reference and the condition of charge or discharge are not critical. The claims should be so interpreted.

After first transistor switch 36 is nonconductive, capacitor 39 charges and both sections of transistor switch 37 are turned on. Emitter resistor 55, 390 ohms, shunts transistor 37b leakage current when transistor 37a is off to prevent improper actuation at high ambient temperature. Transistor 39b is a type 2N5296, and together with transistor 37a, provides adequate current carrying capacity to energize air valve 24 and indicator lamps 43 and 44.

Capacitor 39 in the time delay circuit 38 has a value of 2,100 μf. Resistor 40 is 2,200 ohms and potentiometer 41 is 15,000 ohms. This provides an adjustable time delay of approximately 1 to 5 seconds, insuring that the quarter is milked out before the teat cup is removed. The relative time constants of the positive and negative charge circuits for capacitor 46, however, insure that a dribbling of milk or a sloshing of milk in chamber 17, after capacitor 46 is negatively charged, will not interrupt the removal function. Capacitor 46 requires approximately one-fourth second to charge to its full positive potential, but charges to its full negative potential in about one-tenth that time. Accordingly, once the milk flow has ceased, first switch 36 is turned off and capacitor 39 starts to charge, a substantial resumption of the milk flow is required to turn switch 36 back on. This corrects a condition which was found to be undesirable with the Schilling et al milker where even a temporary resumption of milk flow inhibited and teat cup removal mechanism. The Schilling et al. operation has the effect of permitting dribbling or sloshing to prolong the milking operation and conditioning the cows to release their milk over a longer period of time. This is not only inefficient, but could result in a decrease in milk production. The minimum time delay of circuit 38 is several times as long as the positive charge time for capacitor 46. Accordingly, if the cessation of milk flow which is first sensed and causes negative charging of capacitor 46 was only a temporary condition, ample time is afforded for milk flow to resume and capacitor 46 to recharge positively to the turn on voltage of transistor 36a, before capacitor 39 charges and turns on the second transistor switch 37. Even after air valve 24 is opened, if sufficient milk flow occurs to allow positive charging of capacitor 46, switch 36 will turn on, discharging capacitor 39 and turning switch 37 off. Diode 56, connected across capacitor 46, determines the maximum negative voltage to which capacitor 46 may be charged in the absence of milk flow. This, together with the time constant of the positive charge circuit, establishes a minimum duration for a resumption of milk flow to turn switch 36 on.

Diode 575 1N4004, reversely connected across the load on second transistor switch 37, dissipates the inductive pulse which may result at the time of de-energization of air valve 24.

The inhibit circuit 32 temporarily disables the liquid sensing circuit 23 at the start of the milking operation. Transistor 60 is connected through diode 61 across time delay capacitor 39. When transistor 60 conducts the junction between capacitor 39 and the base of transistor 37a is effectively connected with the negative power supply terminal, preventing the capacitor from charging to turn on transistor switch 37. The inhibit circuit includes a transistors 61 and 62, a PNP 2N4916, whic drive transistor 60. An inhibit timing capacitor 63 is charged with the indicated polarity to initiate the inhibit operation, and discharges through a resistive network to determine the period of the delay.

Before the inhibit period is initiated, transistors 60, 61 and 62 are nonconducting. A positive potential is applied to the base or control element of transistor 61 through resistor 65, 1 megohm, diode 66, resistor 67, 68,000 ohms, and potentiometer 68, 180,000 ohms. The emitter of transistor 61 is connected with a voltage divider including resistor 70, 1,200 ohms, and the Zener diode 71, a 1N7 748A. The voltage on the emitter is more positive than that applied to the base, even with all of potentiometer 68 in the circuit. Accordingly, transistor 61 does not conduct. A positive potential is applied to the base of PNP transistor 62 through resistor 72, 15,000 ohms. As the emitter and base are at the same potential, it does not conduct. The base of transistor 60 is connected with the voltage divider including resistors 73, 1,200 ohms 74, 6,800 ohms, connected in series with the collector of transistor 62. As transistor 62 does not conduct, the base of transistor 60 is at the same negative potential as the emitter and it does not conduct.

The inhibit operation is initiated by closing switch 76 connecting the positive source voltage through diode 77, 1N4004, and resistor 78, 22 ohms, to charge capacitor 63. The time constant of the charging circuit is quite short and only a momentary closing of the switch is required to charge capacitor 63 to the source potential. Diode 66 is back biased by the charge on capacitor 63 and the positive potential of the source through resistor 65 provides bias current to the base of transistor 61, causing it to conduct. The current flowing through resistor 72, transistor 61 and Zener diode 71 establishes a base potential for transistor 62 whih is negative with respect to the emitter potential, causing it to conduct. The current through transistor 62 flows through resistors 73 and 74, applying a positive potential to the base of transistor 60 turning it on and grounding the junction between time delay capacitor 39 and resistor 40 in the time delay circuit 38. Resistor 60a limits the current through transistor 60. This prevents transistor switch 37 from conducting. The liquid sensing circuits for the other three teat cups are connected with trnasistor 60 through diodes 80. Lamps 32a are energized during the inhibit time period.

Capacitor 63 discharges through resistor 67 and potentiometer 68. When the capacitor voltage drops below the emitter voltage of transistor 61 established by Zener diode 71, the base current of transistor 61 is diverted through didoe 66, turning transistor 61 off, ending the inhibit period.

The initial time delay is preferably of the order of 60 seconds, but may be adjusted by potentiometer 68. A reduced inhibit period may be established by momentarily closing switch 81, connecting the positive source voltage across a voltage divider mad up of resistors 82, 560 ohms, and 83, 390 ohms. The junction of these two resistors is connected through diode 77 with the inhibit timing capacitor 63. Discharging from a lower initial voltage establishes a reduced inhibit period which is used to permit replacement of a teat cup which falls off or is removed prematurely.

A circuit is provided for discharging inhibit timing capacitor 63 if the circuit is placed on nonautomatic operation. Diode 85 1N4004, is connected in series with capacitor 63 and resistor 78 between the negative and positive supply terminals. So long as switch 36 is closed, connecting the supply terminals with the power supply 35, diode 85 is back biased and does not conduct. If switch 36 is opened, the charge on capacitor 63 causes it to conduct through a circuit including resistor 86, 680 ohms, connected across the power supply terminals, rapidly discharging the capacitor. This circuit is particularly useful when a milker unit is replaced on an animal that has partially been milked, to insure that the inhibit circuit will not prevent removal of a teat cup when no milk is flowing.

The AND gate and output circuit 33 includes a first transistor switch 90 which conducts so long as milk continues to flow from any quarter of the animal and a second transistor switch 91 which does not conduct until milk has ceased flowing from all four quarters. Both switches include two cascade connected transistors driver stages 90a, 91a and power stages 90b and 91b, both 2N5296. The base of transistor 90a is connected through resistor 92, 6800 ohms, and diode 93 with the collectors of transistors 37a and 37b in the liquid sensing circuit. Transistors 37a and 37b do not conduct until milk flow in the associated quarter has ceased. Accordingly, the collectors are at the positive source potential which is applied to the base of transistor 90a through diode 93 and resistor 92 so long as milk flows. The base of transistor 90a is returned to the negative source terminal through resistor 94, 1200 ohms. The positive potential on the base of transistor 90a causes it to conduct. The corresponding second transistor switches of the liquid sensing circuits for the other three quarters are connected with the base of transistor 90a through diodes 95. The didoes 93, 95 and the resistive network 92, 94, comprise an AND gate which establishes a positive potential on the base of transistor 90a so long as milk continues to flow from any quarter of the cow. The emitter of transistor 90a is connected with the base of transistor 90b and through resistor 96, 390 ohms, with the negative source terminal. Transistor 90b conducts so long as transistor 90a conducts. Connected in the collector circuit of transistors 90a, 90b is a load resistor 92, 1,200 ohms, and a shunt load circuit including indicator light 98 and other system control devices such as motor drive relay 99 for a feed mechanism (not shown) which delivers feed to the animal as it is milked. So long as milk continues to flow, light 98 is energized and system control devices such as feed motor 99 operate. When milk ceases to flow from all four quarters of the animal, the positive potential on the base of transistor 90a is removed and transistor switch 90 ceases to conduct.

The base of transistor 91a is connected through resistor 101, 6,800 ohms, with the collectors of transistors 90a and 90b, and is returned to the negative source terminal by resistor 102, 1,200 ohms. While milk flows and transistors 90a and 90b conduct, transistor 91a and transistor 91b connected thereto are nonconductive as a negative potential is applied to the base of each. When transistor switch 90 becomes non-conductive, a positive potential is applied to the base of transistor 91a causing it to conduct in turn applying a positive potential across resistor 103, 390 ohms, to the base of transistor 91b, causing it to conduct. The combined currents of the two transistors operate a system control device (not shown) or generate a signal, as lamp 104, indicating to the operator that the milking operation is completed.

Depending on the output load current and sensing circuit stability required, single-transistor switches may be used in lieu of the two-transistor switches 36, 37, 90 and 91.

We claim:

1. A control for a milker having teat cups for attachment to an animal's teats and means for individually removing each teat cup, comprising:

means for sensing a flow of milk from each teat cup;
an electronic circuit connected with said sensing means, having a first condition during continued flow of milk and a second condition in the absence of a flow of milk, said circuit being connected with said teat cup removing means for actuation thereof in said second condition, said circuit including timing means operative in the second condition of the circuit rendering the circuit insensitive to a temporary resumption of milk flow and responsive to a continued resumption of milk flow for reestablishing said first condition and terminating actuation of said teat cup removing means.

2. The milker control of claim 1 wherein said circuit includes:

means responsive to said flow sensing means for changing said circuit from the first to the second condition on cessation of milk flow; and
means responsive to said flow sensing means for changing said circuit from the second to the first condition on resumption of milk flow, the time for changing from the first to the second condition being less than the time for changing from the second to the first condition, rendering the control insensitive to a temporary resumption of milk flow.

3. The milker control of claim 2 wherein the time for changing from the first to the second condition of said circuit is less than one-fourth second and the time for changing from the second to the first condition of the circuit is of the order of at least one-fourth second.

4. The milker control of claim 1 wherein the means rendering the circuit insensitive to a temporary resumption of milk flow includes:

a capacitor connected with said flow sensing means;
a high impedance path connected with the capacitor for charging the capacitor in one sense;

a low impedance path connected with the capacitor and operative in the absence of milk flow for charging the capacitor in the opposite sense; and means responsive to a charge of said one sense on the capacitor for maintaining said circuit in its first condition.

5. The milker control of claim 1 wherein said circuit includes:

a transistor switch with a control element;

a source of operating potential for said transistor switch;

a capacitor connected with said control element;

a first charge circuit connecting said capacitor with said source of operating potential of one polarity, a charge on the capacitor of said one polarity establishing the first circuit condition; and a second charge circuit connecting the capacitor with said milk flow sensing means and with a potential source of the opposite polarity, to charge the capacitor with the opposite polarity in the absence of milk flow, establishing the second circuit condition, the time constant of the first charge circuit being greater than the time constant of the second charge circuit to render the control insensitive to a temporary resumption of milk flow.

6. The milker control of claim 1 wherein said circuit includes:

a transistor switch having a control element and having first and second circuit conditions;

a capacitor connected with said control element;

a source of DC operating potential;

a resistive circuit connecting said capacitor with said DC source to charge the capacitor with one polarity, and establish said first circuit condition of said transistor switch;

a source of AC operating potential;

a probe connected with said AC source and positioned in the path of milk flow, the circuit from said AC source being completed through the milk; and a diode connecting said capacitor with said probe and conductive only in the absence of milk flow to charge said capacitor with the opposite polarity and establish the second circuit condition of said transistor switch.

7. A control for a milker having teat cups for attachment to an animal's teats and means for individually removing said teat cups, comprising:

means for sensing a flow of milk from each teat cup and for providing an electrical signal upon cessation of milk flow;

a time delay circuit connected with said sensing means and operative on occurrence of said signal to initiate a timing period; and a solid state switch connected with said time delay circuit and operative upon completion of the timing period to actuate said teat cup removing means.

8. The milker control of claim 2 wherein said circuit includes:

a time delay circuit connected with said teat cup removing means, operative on occurrence of said second circuit condition to initiate a timing period, the period of said time delay means being several times as long as the time for changing the circuit from the first to the second condition on cessation of milk flow and at least as long as the time for changing the circuit from said second to said first condition on resumption of milk flow.

9. The milker control of claim 7 including:

a first switch responsive to said sensor;

a time delay circuit responsive to the first switch; and a second switch responsive to the time delay circuit for actuating said teat cup removing means.

10. The milker control of claim 9 wherein said first and second switches are transistors having control elements, the control element of the first transistor switch being connected with said sensor and the control element of the second transistor switch being connected with the time delay means.

11. The milker control of claim 10 wherein said time delay means includes:

a capacitor connected with the control element of the second transistor switch; and a resistive charging circuit connected with the capacitor.

12. A control for a milker having teat cups for attachment to an animal's teats and means for individually removing each teat cup, comprising:

means for sensing a flow of milk from each teat cup;

an electronic circuit connected with said sensing means, having a first condition during continued flow of milk and a second condition in the absence of flow of milk, said circuit being connected with said teat cup removing means for actuation thereof in said second condition;

a transistor switch connected with said electronic circuit having a temporary inhibit condition maintaining said electronic circuit in its first condition in the absence of a flow of milk, said transistor switch having a control element;

a capacitor connected with said control element;

a source of operating potential;

a manual switch actuable by an operator to connect said capacitor with said source, charging the capacitor and establishing the temporary condition of said transistor switch; and a resistive network connected with said capacitor to dissipate the charge thereon, the time constant of the capacitor and resistive network establishing the duration of the temporary condition of said transistor switch.

13. The milker control of claim 12 including:

a voltage divider connected with said source of potential; and a second manual switch actuable by the operator to connect said capacitor with said voltage divider to establish the temporary condition of said transistor for a period of time shorter than that established by actuation of the first mentioned switch.

14. The milker control of claim 12 including:

switch means actuable for interrupting the connection of the transistor switch circuit with the source of operating potential; and an auxiliary discharge circuit for said capacitor having a diode connected with the capacitor and the cource of operating potential and back biased by said source, said diode conducting upon actuation of said switch means, to discharge said capacitor.

15. The milker control of claim 12 including a voltage regulator connected with said transistor switch to stabilize the operation thereof in the event of a variation in the operating potential.

16. An automatic milker having:

four teat cups for attachment to an animal's teats;

means associated with each of said teat cups for sensing the flow of milk therefrom;

a sensing circuit connected with each of said sensing means having a first condition in response to a flow of milk from the associated teat cup and a second condition in response to the absence of a flow of milk from the associated teat cup; and an output circuit connected with each of said sensing circuits, having a first condition responsive to a flow of milk from any one of the teat cups and a second condition responsive to an absence of a flow of milk from all of said teat cups.

17. The automatic milker of claim 16 wherein the sensing circuits have output signals of different voltage levels representing the first and second conditions and the output circuit includes a gate circuit means responsive to the sensing circuit output signals to establish the output circuit conditions.

18. The automatic milker of claim 16 including an operator signal connected with said output circuit and actuated upon occurrence of the second condition thereof.

19. The automatic milker of claim 16 including a device connected with said output circuit and actuated upon occurrence of the first condition thereof.

20. The automatic milker of claim 19 wherein said device is a feed motor for delivering feed to the animal being milked.

21. The automatic milker of claim 16 in which said output circuit includes:

first switch means conductive in the first condition of the output circuit and nonconductive in the second condition thereof;

second switch means nonconductive in the first condition of the output circuit and conductive in the second condition thereof;

a first device connected with said first switch means and energized during the milking operation; and a second device connected with said second switch means and energized upon termination of the milking operation.

22. The automatic milker of claim 21 in which the first device is a feed motor for delivering feed to the animal being milked and the second device is an operator signal.

* * * * *